INVENTORS:
ALBERT COHEN
PHILLIP DAVIS
& JOSEPH A. ORABONA

BY
ATTORNEYS

April 4, 1961 A. COHEN ET AL 2,978,704
RADOME STRUCTURAL DEVICES
Filed Feb. 3, 1959 3 Sheets-Sheet 2

INVENTORS:
ALBERT COHEN
PHILLIP DAVIS
& JOSEPH A. ORABONA

BY
ATTORNEYS

INVENTORS:
ALBERT COHEN
PHILLIP DAVIS
& JOSEPH F. ORABONA

BY
ATTORNEYS

United States Patent Office 2,978,704
Patented Apr. 4, 1961

2,978,704

RADOME STRUCTURAL DEVICES

Albert Cohen, Tewksbury, Phillip Davis, Melrose, and Joseph F. Orabona, Sudbury, Mass., assignors to the United States of America as represented by the Secretary of the Air Force Filed Feb. 3, 1959, Ser. No. 790,993

24 Claims. (Cl. 343—872)

This invention relates to structures fabricated from an electrically conductive framework enclosed by electrically non-conductive membranes, which structures have preselected electrical characteristics to function as radome devices, and more particularly, to an improvement in the configuration of the framework to render such radome devices suitable for use with any mode of polarization of the antenna device included therein.

In co-pending application, Serial Number 790,990, entitled "Structural Devices and Methods Pertaining Thereto," the unique and novel features of a building, fabricated from an open metal framework with electrically non-conductive bodies attached to the framework for enclosing openings therein, was set forth and its adaptability to radome devices described in detail. The present invention is also concerned with building construction and with the fabrication of buildings with suitable electrical characteristics to function as radome devices. However, the scope of the present invention is concerned more particularly with the configuration and optimum disposition of metal members comprising the framework of the building to fabricate a radome device, the configuration of which is suitable for employing the radome device with any mode of polarization of a source of electromagnetic wave energy included within said radome device. More particularly, in this regard, in the aforementioned copending application there was disclosed the considerations involved in fabricating a building, which building was suitable to function as a radome device. It was described therein that a rigid building could be constructed having suitable electrical characteristics to enable electromagnetic wave energy to pass through the metal framework if certain electrical criteria were adopted in the fabrication of the building. Furthermore, it was set forth that the building could be designed with sufficient rigidity and structural strength to withstand the severe weather conditions prevalent in arctic climates, and that metal members were selected to satisfy both the electrical and rigidity requirements of the building as a structure and as a radome device. Nevertheless, while the building as a radome device was suited for the transmission and reception of electromagnetic wave energy with a vertically or horizontally polarized source of the energy passing through openings in the framework of the building, the electrical axis of the framework or the orientation of the members thereof had to have a preferred orientation with respect to the mode of polarization of the source since unwanted side-lobes exist if the orientation of members is not properly chosen. Thus, the radome device functioned more optimumly for a horizontally polarized source if the vertical members of the framework were disposed in substantially more continuous parallel straight line paths than the horizontal members. The converse of this phenomenon was found to be applicable for vertically polarized sources.

Thus, of the three elements associated with the transmissibility of electromagnetic wave energy through a radome device of the type described in said co-pending application, to wit, cell size, member cross-section, and member alignment or orientation, it was determined that member alignment controlled the relationship required between the orientation of the framework and the mode of polarization of the antenna device. Accordingly, patterns of member alignment for fabricating a metal framework were investigated to improve the electrical characteristics of a building fabricated in accordance with the principles described in the co-pending applictaion to develop radome devices which would be compatible with any mode of polarization of an antenna device.

It is an object of the present invention to describe a structurally rigid building having sutiable electrical characteristics to function as a radome device for the transmission and reception of electromagnetic wave energy from a source polarized in any manner.

It is an object of the present invention to describe a building comprising an open electrically conductive framework and electrically non-conductive membranes for enclosing the framework, the openness of the framework being suitably dimensioned for the passage of electromagnetic wave energy therethrough and through the membranes and the framework having a suitable configuration for employing the building as a radome device for any mode of polarization of a source of the energy.

It is an object of the present invention to describe a building, the metal framework of which has suitable rigidity characterisitcs to constitute a rigid structure, and which building has suitable electrical characteristics to function as a radome device for any mode of polarization of a source of electromagnetic wave energy included within said radome device.

It is an object of the present invention to describe a building, the electrically conductive framework of which has a preferred orientation of constitutent members thereof, for employing said building as a radome device for any mode of polarization of a source of electromagnetic wave energy included within said radome device.

It is an object of the present invention to describe a building comprising a metal framework and electrically non-conductive membranes, the framework being fabricated from metal members which are aligned to control the spaces therebetween and to impart a pattern of triangular incrementation to the framework, and in which the spaces in the framework are suitably dimensioned for the passage therethrough and through the membranes enclosing said spaces of electromagnetic wave energy from a source independent of the mode of polarization of the source.

It is an object of the present invention to describe a building, the metal framework of which has constituent members thereof disposed in a preselected pattern of orientation so that said building can function suitably as a radome device for any antenna device included therein, irrespective of the mode of polarization of said antenna device.

Accordingly, the present invention is concerned with the electrically conductive framework of a building having suitable electrical characteristics to function as a radome device for any mode of polarization of an antenna device included within the building.

Thus, the present invention represents specific extensions of principles embodied in the invention of the co-pending application wherein the framework is so arranged as to be oriented particularly with respect to the mode of polarization of the antenna device for optimum transmission and reception of electromagnetic wave energy with one mode of polarization of the antenna device.

The criteria for establishing the structural rigidity of the building are based upon the same considerations described in the co-pending application. Thus, the same electrical considerations apply to the function of selecting the dimensions of structural members comprising the framework. Additionally, the orientation of members is preselected to impart a configuration of controlled triangular incrementations to the framework to overcome the disadvantages inherent in the framework of the copending application. The pattern of triangular incrementation can be defined in several ways dependent upon the size of the building. In its broadest sense, the framework may be analogized to a structurally rigid metal shell having openings therein suitable for the passage therethrough of electromagnetic wave energy. Additionally, the openings are disposed in the shell in a manner to define substantially non-continuous and non-parallel metal portions. The shape of the openings is not significant, the only significant consideration being that the openings have suitable area for the passage therethrough of electromagnetic wave energy of particular wavelengths. In fabricating a framework for a building of large diameter, for example a spherically-shaped building having a 150-foot equatorial diameter capable of withstanding 150 m.p.h. winds in an arctic environment, the framework is preferably fabricated from interlocking metal members. In such a framework, the dimensions of metal members, length and cross-section, and the alignment thereof determine the dimensions of the openings between members. Additionally, the alignment of members influences the electrical characteristics of the framework. Triangular incrementation in such a framework is achieved by disposing members to have suitable openness for transmissibility purposes, and also, to define substantially non-continuous and non-parallel metal portions. While a preferred configuration is described for a particular embodiment set forth to describe the present invention, this embodiment is merely illustrative of the present invention, and limiting only in the sense that the configuration of the framework is an optimum one for meeting the requirements of a radome device which can be fabricated from substantially standardized component parts. Other configurations are possible, especially if the requirements for reproducibility and cost of fabrication are relaxed.

These and other objects and advantages will become more apparent in the following description with reference to the accompanying drawings wherein.

Figure 4:
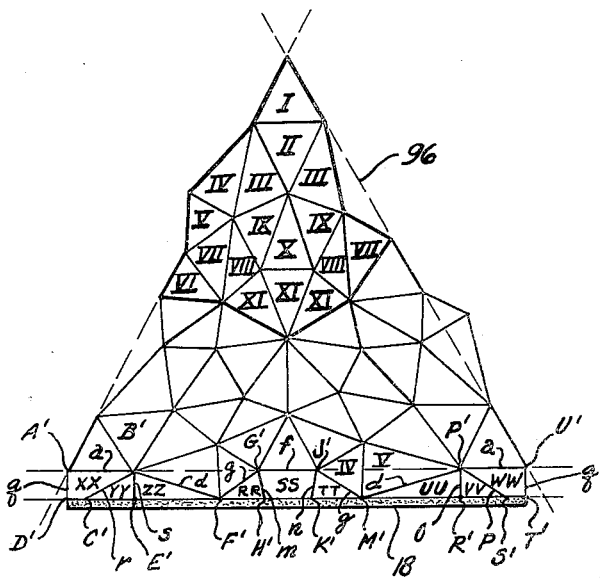
Fig. 4 is a line drawing showing the basic pattern complex of twenty incrementally varying triangles, twice repeated, within the over-all area of an indicated quasi-equilateral triangle, and additionally, depicts the base pattern of the framework.
Figure 5:
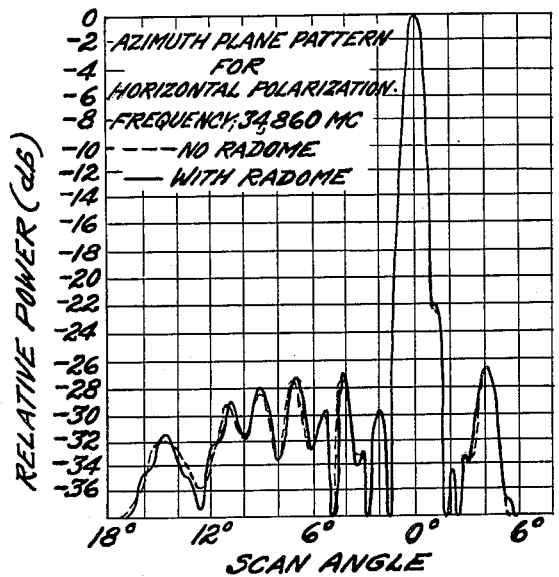
Figure 6:
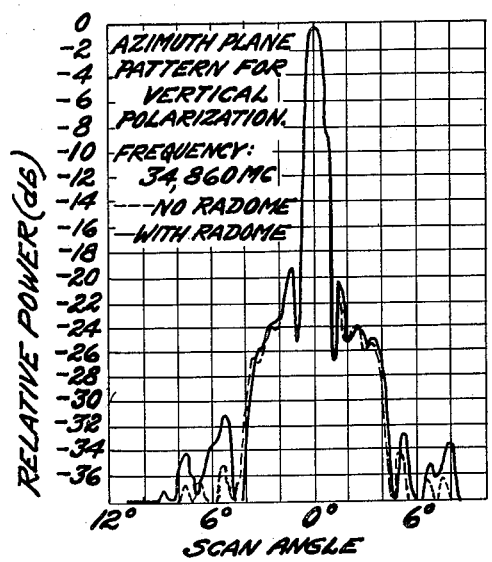

Fig. 5 is a graph of an antenna radiation pattern illustrating the pattern for an antenna device included within a metal framework model, composed of repetitions of the Fig. 4 configuration, and the free-space pattern thereof with the antenna device horizontally polarized; and Fig. 6 is a graph of antenna radiation patterns illustrating the pattern for an antenna device included within a metal framework model, composed of repetitions of the Fig. 4 configuration, and the free-space pattern thereof with the antenna device vertically polarized.

Figure 1:
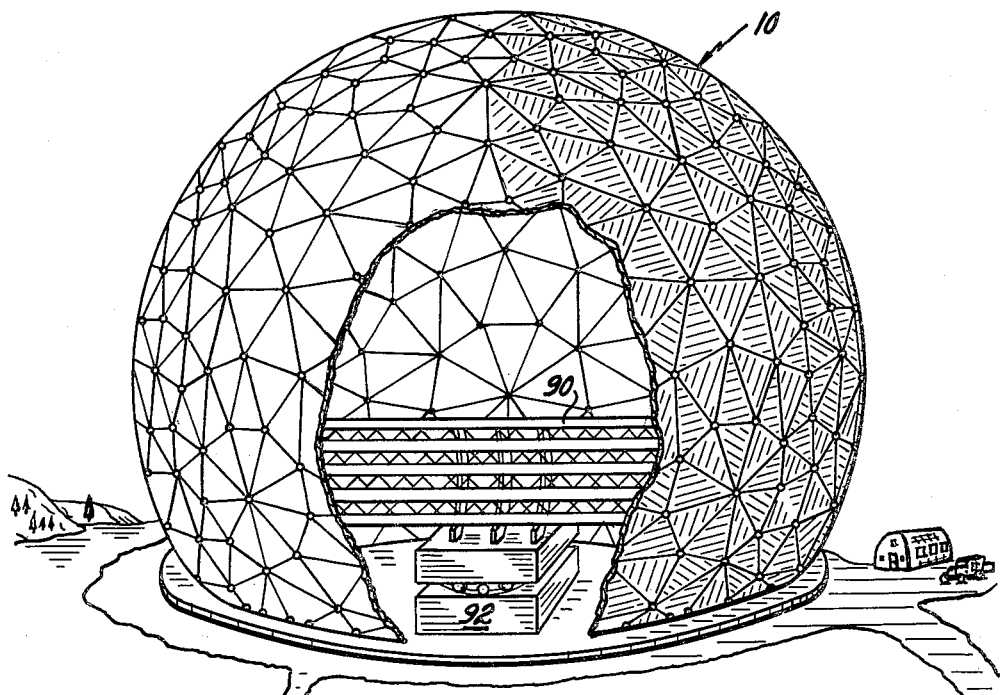
Fig. 1 is a line drawing of a building having an open, electrically conductive framework and enclosed by electrically non-conducting membranes functioning as a radome device for an antenna device located therein, a portion of the framework being cut away to expose the antenna device.
Figure 2:
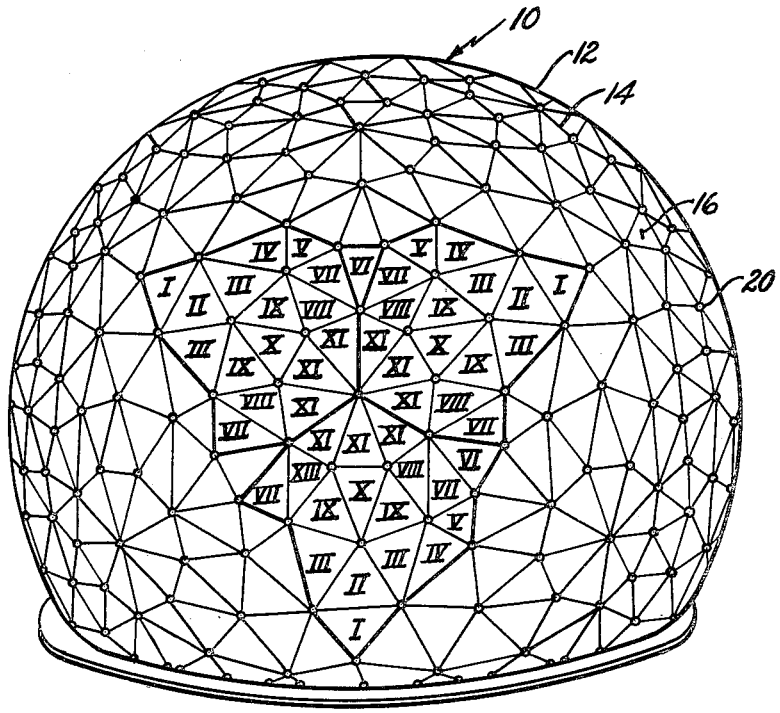
Fig. 2 is a line drawing of the building depicted in Fig. 1 with the basic pattern for disposing structural members comprising the framework depicted therein.

Referring now to Figs. 1 and 2, there is shown the configuration of a building 10 illustrative of a radome device fabricated in accordance with the principles described in the co-pending application, but including a framework configuration consistent with the principles disclosed in the present invention. The building is preferably spherical to function as a radome device in arctic environments due to the low ice collection-efficiency of such a configuration. The embodiment of the invention selected to be described herein is a 150-foot equatorial diameter radome. However, the size of the radome device should not be viewed in any way as a limitation on the scope of the present invention as it is equally applicable to all sizes of radome devices built and constructed in accordance with the principles described in the copending application.

The building 10 is comprised of a metal framework 12 including interconnected spaced metal members 14 and electrically non-conductive membranes 16 or covers carried by the members for enclosing the framework. The building is mounted on a base 18 provided therefor and suitable structural considerations are observed for attaching members of the framework terminating at the base to have a rigid structure capable of withstanding forces attendant on the building. In this regard, the building is fabricated to withstand winds up to 150 m.p.h. The diameter of the base for 150-foot radome device is 123 feet and the building is structurally equivalent to a 10-story building.

Members forming the framework are interconnected at terminals hereinafter referred to as hubs 20 which hub construction is more fully illustrated and described in the co-pending application above identified.

At this point, it should be noted that the same rigidity and electrical considerations described in the co-pending application, are used to select metal members for fabricating the framework; and as described in the co-pending application, the standard member is an efficacious combination of rigidity and electrical considerations. Since the electrical considerations are more associated with the scope of the present invention, a review thereof is included herein.

Three elements form the criteria for the transmissibility of electromagnetic wave energy through a metal framework. They are cell size, member cross-section, and member alignment or orientation. Cell size is determined by the orientation and dimensions of members comprising the framework. However, it is apparent that almost an indefinite number of patterns for forming a rigid structure can be devised to satisfy the requirement of cell size or degree of openness of a metal framework. In fact, whereas triangular openings between members have been depicted in the embodiment of the co-pending application and in the present invention, the shape of the openings is not limited in any way to a triangular configuration. The triangular configuration is merely the result of fabricating the framework from interconnected structural members. A framework could be fabricated from a thin metal shell with openings therein, which may be circular, or even irregularly shaped as long as certain criteria to be described subsequently are incorporated into the design of the framework. However, as is well known to persons skilled in the prior art of utilizing electromagnetic wave energy for intelligence purposes, for example in radar devices, the mere ability to transmit, and perhaps to receive a usable quantity of said energy may not be adequate for the accuracy requirements of a radar device. Thus, in the icosidodecahedron configuration of the co-pending application it was determined that a relationship between the orientation of the framework members and the mode of polarizatoin of the antenna device was required to obtain optimum transmissibility through the radome device.

It has been found that electromagnetic wave energy can be transmitted and received through the openings between members if the length to wavelength ratio $$\frac{L}{\lambda}$$

is greater than, for example four and if the cross-section to wavelength ratio $$\frac{W}{\lambda}$$

is less than, for example, 0.25. These ratios have been adhered to in the fabrication of the embodiment described herein and can be calculated to be between 4 and 7, for length, and approximately 0.1 for the width, using the wavelength for a frequency approximately 450 mc. Cell size for a framework fabricated from a thin metallic shell with circular openings therein is subject to the same criteria set forth for a framework fabricated from interconnected members. Cell size or the openings in a shell framework should be at least four, and preferably greater than four times the wavelength of the energy to be transmitted and received through the opening. Additionally, the openings should be spaced substantially close to each other so that in effect the metal portions between openings can be considered as metal members and subject to the length and cross-section to wavelength ratios described previously for the framework fabricated from interconnected metal members.

Referring now to Figs. 1 and 2, the overall pattern of member alignment or orientation is discernible. In both the vertical and horizontal direction non-continuous straight line paths are distinguishable over the entire framework. This pattern is distinguishable from that of the icosidodecahedron described in the co-pending application where member alignment, while more continuous in one direction than the other, also has pronounced parallelism. Parallelism is substantially non-existent in the present embodiment, and instead, the term triangular incrementation is used to describe the orientation which an antenna device 90 energized by a source 92 of electromagnetic wave energy included within the radome device sees insofar as transmissibility is concerned.

Figure 3:
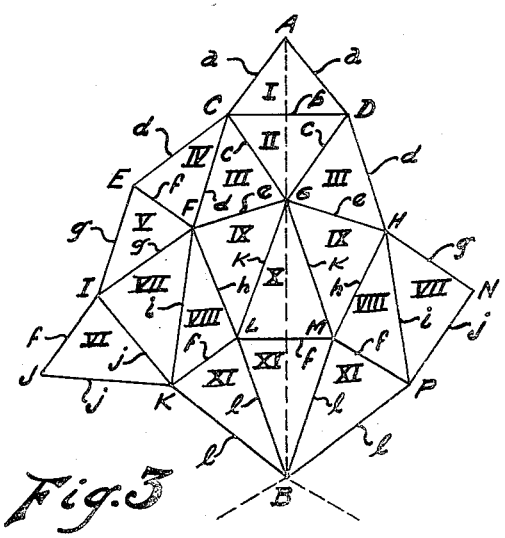
Fig. 3 is a line drawing of the basic pattern of the framework configuration.

In the embodiment being described, a repetitive pattern of irregularly-dimensioned triangles comprises the framework. The basic pattern of irregularly-dimensioned triangles is shown in Fig. 3. The triangles are identified by Roman numbers I through XI in Figs. 3 and 4, and the configuration is referred to as a trapezoidal hexecontrahedron. The length of sides are included angles of the membranes and the length of members are given in the following table:

Table I.—Dimensions of membranes and members

| Triangle No. | Membranes | | Members Length (in.) |
|---|---|---|---|
| | Sides (in.) | Angles (deg.) | |
| I | b=169.18 | CAD=71.690 | b=169.66 |
| | a=142.30 | ACD=54.158 | a=142.80 |
| | a=142.30 | ADC=54.158 | a=142.80 |
| II | b=169.17 | CGD=68.23 | b=169.66 |
| | c=149.21 | GCD=55.88 | c=149.72 |
| | c=149.21 | GDC=55.88 | c=149.72 |
| III [1] | e=139.73 | DHG=56.10 | e=140.23 |
| | d=173.61 | DGH=72.45 | d=174.10 |
| | c=149.24 | HDG=51.44 | c=149.72 |
| IV | f=99.23 | ECF=35.22 | f=99.76 |
| | d=173.61 | FEC=72.39 | d=174.10 |
| | d=173.61 | EFC=72.39 | d=174.10 |
| V | f=99.26 | EIF=57.29 | f=99.76 |
| | g=104.08 | IEF=61.36 | g=104.58 |
| | g=104.08 | IFE=61.36 | g=104.58 |
| VI | f=99.25 | JKI=39.04 | f=99.76 |
| | j=155.78 | KIJ=70.48 | j=156.27 |
| | j=155.78 | KJI=70.48 | j=156.27 |
| VII [1] | g=104.06 | IFK=68.82 | g=104.58 |
| | i=175.98 | KIF=80.27 | i=176.47 |
| | j=155.78 | IKF=37.91 | j=156.27 |
| VIII [1] | h=135.26 | FKL=51.83 | h=135.75 |
| | f=99.24 | KFL=36.68 | f=99.76 |
| | i=176 | FLK=91.49 | i=176.47 |
| IX [1] | e=139.73 | FLG=56.04 | e=140.23 |
| | k=160.61 | LFG=70.31 | k=161.10 |
| | h=135.25 | FGL=53.64 | h=135.75 |
| X | f=99.23 | LGM=37.93 | f=99.76 |
| | k=160.61 | GLM=71.03 | k=161.10 |
| | k=160.61 | GML=71.03 | k=161.10 |
| XI [1] | f=99.25 | BLK=70.09 | f=99.76 |
| | e=152.61 | BKL=70.09 | e=153.10 |
| | e=152.61 | KBL=39.82 | e=153.10 |

Table I.—Dimensions of membranes and members—Continued

| Triangle No. | Base Membranes | | Members Length (in.) |
|---|---|---|---|
| | Sides (in.) | Angles (deg.) | |
| RR | m=46.89 | H'G'F'=80.27 | |
| | q=104.06 | G'H'F'=73.68 | |
| | base=113.46 | H'F'G'=26.05 | |
| SS | f=99.25 | J'G'H'=70.48 | |
| | n=47.44 | G'J'H'=70.48 | |
| | m=47.44 | G'H'K'=109.52 | |
| | base=75.61 | H'K'J'=109.52 | |
| TT | q=104.06 | M'J'K'=80.27 | |
| | n=46.89 | J'M'K'=26.05 | |
| | base=113.46 | M'K'J'=73.68 | |
| UU | o=83.43 | R'P'M'=51.44 | |
| | d=173.61 | P'R'M'=100.30 | |
| | base=141.18 | R'M'P'=28.26 | |
| VV | p=132.32 | S'P'R'=55.88 | |
| | o=83.18 | P'S'R'=39.83 | |
| | base=114.73 | S'R'P'=84.29 | |
| WW | a=142.30 | P'U'T'=71.69 | |
| | p=134.46 | U'P'S'=54.158 | |
| | q=123.03 | U'T'S'=92.20 | |
| | base=32.68 | T'S'P'=141.95 | |
| XX | a=142.30 | A'B'C'=54.158 | |
| | q=123.03 | B'A'D'=71.67 | |
| | r=134.46 | A'D'C'=92.20 | |
| | base=32.68 | D'C'B'=141.95 | |
| YY | s=83.13 | E'B'C'=55.88 | |
| | r=132.32 | B'C'E'=39.83 | |
| | base=114.73 | C'E'B'=84.29 | |
| ZZ | d=173.61 | F'B'E'=51.44 | |
| | s=83.43 | B'E'F'=100.30 | |
| | base=146.82 | B'F'E'=28.26 | |

[1] Indicates the existence of a mirror image membrane.

A review of the data indicates that the basic pattern formed by interconnected structural members results in eleven different triangles comprised of 12 different side lengths, exclusive of the more irregularly shaped polygons required along the base. The smallest member length is member $f$, 99.76 inches, and the longest member length is member $i$, 176.47 inches. Member $f$ recurs as a side in 6 triangles, therefore, its length to wavelength ratio, 3.8, for a frequency of approximately 450 mc. is substantially close to the preferred ratio of four plus, and negligible, if any, adverse electrical phenomena result from the length of this member. The length to wavelength ratio for the largest member, $i$, is 6.7, which is well within the preferred ratio range. With the exception of the member $f$, member lengths satisfy the preferred ratio. Irregularities of member lengths terminating at the base are deemed insignificant insofar as the electrical effects resulting therefrom are concerned in the overall effect of the metal framework on the electromagnetic wave energy pattern obtainable using the framework.

The basic pattern shown in Fig. 3 is repeated by two 120-degree rotations about the point B as shown in Fig. 4; the resulting pattern is a deformity of an equilateral triangle 96. Stated otherwise, the basic pattern is a pattern of triangular incrementation devised by repetitively adding dimensional increments to one third of an equilateral triangle. The entire configuration of the framework may be viewed as a rigid structure, having predetermined electrical characteristics, resulting from adding dimensional increments to the 20 spherical equilateral triangles comprising the geometrical configuration of an icosahedron.

An inspection of the basic pattern discloses that there is a distinct absence of continuity in the vertical and horizontal directions between members interconnected at a terminal hub. Additionally, there are no parallel continuity paths and substantially little parallelism between the individual sides of the triangles. It should be noted that a pattern with fewer different triangles could be achieved by varying the length of members from the preferred $$\frac{L}{\lambda}$$

ratio of 4. However, reproducibility, cost, and factors concerned with fabrication are of importance from a practical standpoint in building radome devices and the configuration of the framework reflects such considerations.

Theoretically, an infinite number of configurations would be possible for orienting members of a framework to achieve non-continuous straight line paths and non-parallelism among members with suitable spacing therebetween for transmissibility. This becomes even more evident if the overall shape of the building is other than spherical and if size and rigidity requirements are more relaxed. Such is not the criteria for designing the embodiment of this and the above-identified co-pending application. In this regard, in the broad aspect, as discussed in said aforementioned co-pending application, and equally significant in regard to the present invention, the building may be thought of as comprising a metal framework with openings therein of suitable size, and enclosed with electrically non-conductive membranes, to enable energy to pass through said membranes substantially unimpeded. Thus, the framework in one case can be analogized to a metal shell with suitable openings therein for the transmission and reception of energy more optimumly in one direction than the other depending upon the mode of polarization of the antenna device. Within the scope of the present invention, the framework may be analogized to a metal shell with suitable openings therein disposed in such a manner as to disrupt the continuity of the shell and to eliminate parallelism between portions of the shell defining said openings. When the framework has the aforementioned configuration, or the orientation of members as described in the embodiment being considered, the framework can be used to transmit and receive energy with any mode of polarization of the antenna device included therein.

The manner of securing members and membranes terminating at the base is more fully illustrated and described in co-pending application Number 790,991, filed February 3, 1959, entitled: "Membranous Covering for Structural Devices, and Fastening Means Therefor."

Figs. 5 and 6 show the radiation patterns obtainable in the space, with and without a metal framework, having a configuration of the illustrated embodiment interposed between the antenna device and the free space. The radiation pattern shown in Fig. 6 was obtained with a framework using a vertically polarized antenna device. The radiation pattern shown in Fig. 5 was obtained with a framework using a horizontally polarized antenna device. Both patterns were obtained with the same orientation of the framework. In each illustration the radiation pattern shown in solid lines is the free-space pattern. The dotted lines depict the effect of the radome on the free-space patterns. It will be noted that only slight changes result in the main lobe and side-lobe distributions which indicate the novel and unique aspects of the present invention.

The absence of adverse interference with the transmission and reception of electromagnetic wave energy can be explained satisfactorily by reconsidering the elements associated therewith as regards a metal framework. Cell size and member cross-section, which determine the total aperture blocked or the degree of openness of the framework, have been previously mentioned, and it was shown that the present embodiment encompasses the criteria for these elements. However, because non-continuity of straight line paths exists and there is substantially an absence of parallelism between members, the currents induced in said members are not aligned in polarization and energy re-radiated from said members has a negligible, or small, secondary principal maxima pattern that can add to the primary-antenna pattern to result in modification of the gain and side-lobe distribution of the radiation pattern. Thus, the configuration for fabricating a structure with a pattern of triangular incrementation.

Having described the principles of the present invention, it is desirable that the scope of the present invention not be limited by the size, quality of materials, or any specific configuration for fabricating a structure with a random configuration. Accordingly, it is desirable that the scope of the present invention be determined by the appended claims.

What is claimed is:

1. A structure with suitable electrical characteristics to function as a radome device fabricated from an electrically conductive framework enclosed by electrically non-conductive membranes, said structure comprising a framework with a pattern of openings therein conforming to triangles of progressively increasing dimensions, grouped into sub-patterns that repeat to form quasi-equilateral triangular areas for the passage therethrough and through the membranes of electromagnetic wave energy, said pattern of openings being oriented in preselected planes for defining the configuration of the framework presented to the energy to enable the structure to function as a radome device with any mode of polarization of a source of the energy.

2. A structure with suitable electrical characteristics to to function as a radome device fabricated from an electrically conductive framework enclosed by electrically non-conductive membranes, said structure comprising a framework with a pattern of spaced openings therein conforming to triangles of progressively increasing dimensions, grouped into sub-patterns that repeat to form quasi-equilateral triangular areas for the passage therethrough and through the membranes of electromagnetic wave energy substantially unimpeded, said patterns of spaced openings being disposed in planes for defining a framework with a configuration of the electrically conductive portions suitable for any mode of polarization of a source of the energy.

3. A structure with suitable electrical characteristics to function as a radome device fabricated from a metal framework enclosed by electrically non-conductive membranes, said structure comprising a framework with a pattern of spaced openings therein conforming to triangles of progressively increasing dimensions, grouped into sub-patterns that repeat to form quasi-equilateral triangular areas for the passage therethrough and through the membranes enclosing the openings of electromagnetic wave energy substantially unimpeded, said pattern of openings being disposed in planes for defining a metal framework with configurations suitable for transmitting and receiving the energy from any mode of polarization of a source of the energy.

4. A structure with suitable electrical characteristics to function as a radome device fabricated from an electrically conductive framework enclosed by electrically non-conductive membranes, said structure comprising a framework with a pattern of spaced openings disposed therein conforming to triangles of progressively increasing dimensions, grouped into sub-patterns that repeat to form quasi-equilateral triangular areas for the passage through said openings and through the membranes enclosing said openings of electromagnetic wave energy substantially unimpeded, said pattern of openings defining a framework configuration of substantially non-continuous and non-parallel paths suitable for transmitting and receiving the energy from any mode of polarization of a source of the energy.

5. A structure with suitable electrical characteristics to function as a radome device fabricated from an electrically conductive framework enclosed by electrically non-conductive membranes, said structure comprising a framework with a pattern of spaced openings disposed therein conforming to triangles of progressively increasing dimensions, grouped into sub-patterns that repeat to form quasi-equilateral triangular areas for the passage through said openings and through the membranes enclosing said openings of electromagnetic wave energy substantially unimpeded, said pattern of openings defining a rigid framework support for the structure and imparting a configuration of substantially non-continuous and non-parallel electrically conductive portions suitable for transmitting and receiving the energy from any mode of polarization of a source of the energy.

6. A structure with suitable electrical characteristics to function as a radome device fabricated from an electrically conductive framework enclosed by electrically non-conductive membranes, said structure comprising a framework with a pattern of substantially different openings disposed therein conforming to triangles of progressively increasing dimensions, grouped into sub-patterns that repeat to form quasi-equilateral triangular areas for the passage through said openings and through the membranes enclosing said openings of electromagnetic wave energy substantially unimpeded, said pattern of openings defining a rigid framework support for the structure and imparting a pattern of triangular incrementation of substantially non-continuous and non-parallel electrically conductive portions suitable for transmitting and receiving the energy from any mode of polarization of a source of the energy.

7. A structure with suitable electrical characteristics to function as a radome device fabricated from a metal framework enclosed by electrically non-conductive membranes, said structure comprising a framework with a repetitive pattern of openings disposed therein conforming to triangles of progressively increasing dimensions, grouped into sub-patterns that repeat to form quasi-equilateral triangular areas for the passage through said openings and through the membranes enclosing said openings of electromagnetic wave energy from a source included within the structure, said pattern of openings defining a rigid framework support for the structure and a configuration of substantially non-continuous and non-parallel metal portions suitable for transmitting and receiving the energy from any mode of polarization of the source of the energy.

8. A structure with suitable electrical characteristics to function as a radome device fabricated from an electrically conductive framework enclosed by electrically non-conductive membranes, said structure comprising a framework with a pattern of openings disposed therein having dimensions from four to seven times the wavelength of electromagnetic wave energy to pass through said openings substantially unimpeded, said pattern of openings defining a rigid framework support for the structure and a configuration of substantially non-continuous and non-parallel metal portions suitable for transmitting and receiving the energy from any mode of polarization of a source of the energy.

9. A structure with suitable electrical characteristics to function as a radome device fabricated from an electrically conductive framework enclosed by electrically non-conductive membranes, said structure comprising a framework with a pattern of openings disposed therein having progressively increasing triangle-forming dimensions dependent upon the wavelength of electromagnetic wave energy passing through said openings substantially unimpeded from a source included within the structure, said pattern of openings defining a rigid framework support for the structure and imparting a configuration of substantially non-continuous and non-parallel electrically conductive portions suitable for transmitting the energy from any mode of polarization of the source of the energy and for receiving a portion of the transmitted energy without substantial diminution of the power thereof.

10. A structure with suitable electrical characteristics to function as a radome device fabricated from an electrically conductive framework enclosed by electrically non-conductive membranes, said structure comprising a framework with a repetitive pattern of openings disposed therein with dimensions from four to seven times the wavelength of electromagnetic wave energy to pass through said openings substantially unimpeded from a source included within the structure, said pattern of openings defining a rigid framework support for the structure and imparting a configuration of substantially non-continuous and non-parallel electrically conductive portions suitable for transmitting the energy from any mode of polarization of the source of the energy and for receiving a portion of the transmitted energy without substantial diminution of the power thereof.

11. A structure with suitable electrical characteristics to function as a radome device fabricated from an open electrically conductive framework enclosed by electrically non-conductive membranes, said structure comprising a framework with a pattern of openings therein formed by the alignment of electrically conductive members comprising the framework, said openings having suitable progressively increasing triangle-forming dimensions for the passage therethrough and through the membranes of electromagnetic wave energy, said members being oriented in planes compatible with any mode of polarization of a source of the energy.

12. A structure with suitable electrical characteristics to function as a radome device fabricated from an open electrically conductive framework comprised of electrically conductive members with the spaces therebetween enclosed by electrically non-conductive membranes, said structure comprising a framework with a pattern of spaces therein formed by the alignment of electrically conductive members, said spaces having suitable progressively increasing triangle-forming dimensions for the passage therethrough and through the membranes of electromagnetic wave energy substantially unimpeded, said members defining a framework with configuration suitable for any mode of polarization of a source of the energy.

13. A structure with suitable electrical characteristics to function as a radome device fabricated from an open metal framework comprised of metal members with the spaces therebetween enclosed by electrically non-conductive membranes, said structure comprising a framework with a pattern of spaces in the framework formed by the alignment of metal members with suitable progressively increasing triangle-forming dimensions for the passage therethrough and through the membranes of electromagnetic wave energy substantially unimpeded, said members defining a framework with configuration suitable for transmitting and receiving the energy from any mode of polarization of a source of the energy.

14. A structure with suitable electrical characteristics to function as a radome device fabricated from an open electrically conductive framework comprised of electrically conductive members with the spaces therebetween enclosed by electrically non-conductive membranes, said structure comprising a framework with a pattern of open spaces therein formed by the alignment of electrically conductive members, said spaces having suitable progressively increasing triangle-forming dimensions therebetween for the passage through said spaces and the bodies enclosing said spaces of electromagnetic wave energy substantially unimpeded, said members defining a framework configuration of substantially non-continuous and non-parallel electrically conductive portions suitable for transmitting and receiving the energy from any mode of polarization of a source of the energy.

15. A structure with suitable electrical characteristics to function as a radome device fabricated from an electrically conductive framework comprised of electrically conductive members with the spaces therebetween enclosed by electrically non-conductive membranes, said structure comprising a framework with a pattern of open spaces therein formed by the alignment of electrically conductive members, said spaces having suitable progressively increasing triangle-forming dimensions for the passage therethrough and through the membranes enclosing said spaces of electromagnetic wave energy substantially unimpeded, said members defining a rigid framework support for the structure and a configuration of substantially non-continuous and non-parallel electrically conductive portions suitable for transmitting and receiving the energy from any mode of polarization of a source of the energy.

16. A structure with suitable electrical characteristics to function as a radome device fabricated from an open metal framework comprised of metal members with the spaces therebetween enclosed by electrically non-conductive membranes, said structure comprising a framework with a pattern of substantially varied spaces therein formed by the alignment of metal members, said spaces having suitable progressively increasing triangle-forming dimensions for the passage through said spaces and the membranes enclosing said spaces of electromagnetic wave energy substantially unimpeded, said members defining a rigid framework support for the structure and a configuration of substantially non-continuous and non-parallel metal portions suitable for transmitting and receiving the energy from any mode of polarization of a source of the energy.

17. A structure with suitable electrical characteristics to function as a radome device fabricated from an open metal framework comprised of metal members with the spaces therebetween enclosed by electrically non-conductive membranes, said structure comprising a framework with a pattern of open spaces therein formed by the alignment of metal members, said spaces having suitable progressively increasing triangle-forming dimensions for the passage therethrough and through the membranes enclosing said spaces of electromagnetic wave energy from a source included within the structure, said members defining a rigid framework support for the structure and a configuration of substantially non-continuous and non-parallel metal portions suitable for transmitting and receiving the energy from any mode of polarization of the source of the energy.

18. A structure with suitable electrical characteristics to function as a radome device fabricated from an open electrically conductive framework comprised of electrically conductive members with the spaces therebetween enclosed by electrically non-conductive membranes, said structure comprising a framework with a pattern of open spaces therein formed by the alignment of electrically conductive members, said members having progressively increasing gate-forming dimensions dependent upon the wavelength of electromagnetic wave energy passing through said openings substantially unimpeded, and defining a rigid framework support for the structure with a configuration of substantially non-continuous and non-parallel electrically conductive portions suitable for transmitting and receiving the energy from any mode of polarization of a source of the energy.

19. A structure with suitable electrical characteristics to function as a radome device fabricated from an open electrically conductive framework comprised of electrically conductive members with the spaces therebetween enclosed by electrically non-conductive membranes, said structure comprising a framework with a pattern of open spaces therein formed by the alignment of electrically conductive members, said spaces having progressively increasing gate-forming dimensions dependent upon the wavelength of electromagnetic wave energy passing through said openings substantially unimpeded from a source included within the structure, said members defining a rigid framework support for the structure and a configuration of substantially non-continuous and non-parallel electrically conductive portions suitable for transmitting and receiving the energy from any mode of polarization of the source of the energy.

20. A structure with suitable electrical characteristics to function as a radome device fabricated from a framework comprised of metal members with the spaces therebetween enclosed by electrically non-conductive membranes, said structure comprising a framework with a pattern of open spaces therein formed by the alignment of metal members, said spaces having progressively increasing gate-forming dimensions suitable for the passage therethrough and through the enclosing membranes of electromagnetic wave energy, said members having dimensions for controlling the dimensions of said spaces dependent upon the wavelength of the energy and defining a rigid framework support for the structure of substantially non-continuous and non-parallel metal portions, the structure being suitable for the transmission and reception of the energy from any mode of polarization of the source of the energy.

21. A building with suitable electrical characteristics to function as a radome device fabricated from an electrically conductive framework comprised of electrically conductive members with the spaces therebetween enclosed by electrically non-conductive membranes, said structure comprising a frame-work with a pattern of open spaces therein formed by the alignment of electrically conductive members, said members having pre-selected progressively increasing gate-forming dimensions dependent upon the wavelength of electromagnetic wave energy passing through said openings substantially unimpeded from a source of said energy included within the building, said openings having preselected dimensions dependent upon the dimensions and orientation of said members defining a rigid framework support for the building with a configuration comprised of non-continuous and non-parallel electrically conductive portions, the building being suitable for transmitting energy from any mode of polarization of the source of the energy and for receiving a portion of the transmitted energy without substantial diminution of the power thereof.

22. A structure with suitable electrical characteristics to function as a radome device fabricated from a framework comprised of electrically conductive members with spaces therebetween enclosed by electrically non-conductive membranes, said structure comprising a framework with a repetitive pattern of spaces therein formed by the alignment of electrically conductive members disposed in a substantially spherical-shaped framework, said spaces having dimensions suitable for the passage therethrough and through the membranes enclosing said spaces of electromagnetic wave energy substantially unimpeded, said members having dimensions from four to seven times the wavelength of the energy to pass through said framework and defining a rigid framework support for the structure, said framework having substantially non-continuous and non-parallel member portions and suitable for the transmission and reception of the energy from any mode of polarization of the source of the energy.

23. A structure with suitable electrical characteristics to function as a radome device fabricated from a framework comprised of interconnected metal members with the spaces therebetween enclosed by electrically non-conductive membranes, said structure comprising a framework with a repetitive pattern of spaces therein formed by the alignment of metal members disposed in a substantially spherical-shaped configuration, said members having preselected progressively increasing gate-forming dimensions the cross-section of which is preferably less than 0.25 times the wavelength of electromagnetic wave energy to pass through said framework, said spaces having suitable dimensions dependent upon the dimensions of said members for the passage therethrough and through the membranes enclosing said spaces of the energy, said members being disposed substantially non-continuous and non-parallel in said framework, said framework being suitable for transmitting and receiving the energy from any mode of polarization of the source of the energy.

24. In a structure of the character described, a framework of structural elements whose cross-sectional areas are less than 0.25 times the wavelength of electromagnetic energy passing therethrough, said elements being of progressively varying length to form triangles of varying sizes and angular configurations, arranged in groups of $n$ triangles each, with every three of such groups being interrelated to form a three-fold pattern of triangles within an over-all quasi-equilateral triangular area, such that each of the $3n$ cells thereby defined has bounding sides whose dimensions fall between four and seven times said wavelength, and such that no one of said structural elements is parallel to any other of said structural elements, and thereby there is produced a structure having substantially the same degree of two-way wave transmitting efficiency whether the plane of wave polarization is horizontal, vertical, or oblique.

References Cited in the file of this patent
UNITED STATES PATENTS 2,607,009     Affel _____ Aug. 12, 1952

OTHER REFERENCES

Publication: IRE Convention Record, 1956, Part I, volume 4, Future Trends in Radomes for Ground Electronic Equipment, by Ratynski, pp. 236 to 241.